(12) United States Patent
Rizzoli et al.

(10) Patent No.: US 11,144,798 B2
(45) Date of Patent: Oct. 12, 2021

(54) CONTEXTUALLY AWARE SYSTEM AND METHOD

(71) Applicant: V7 LTD., London (GB)

(72) Inventors: Alberto Rizzoli, San Francisco, CA (US); Simon Edwardsson, San Francisco, CA (US)

(73) Assignee: V7 LTD., London (GB)

( * ) Notice: Subject to any disclaimer, the term of this patent is extended or adjusted under 35 U.S.C. 154(b) by 0 days.

(21) Appl. No.: 16/462,550

(22) PCT Filed: Nov. 21, 2017

(86) PCT No.: PCT/IB2017/001411
§ 371 (c)(1),
(2) Date: May 21, 2019

(87) PCT Pub. No.: WO2018/091963
PCT Pub. Date: May 24, 2018

(65) Prior Publication Data
US 2019/0318211 A1  Oct. 17, 2019

(30) Foreign Application Priority Data
Nov. 21, 2016 (AU) .................. 2016904758

(51) Int. Cl.
*G06K 9/72* (2006.01)
*G06K 9/00* (2006.01)
*G06N 3/02* (2006.01)

(52) U.S. Cl.
CPC ........... *G06K 9/72* (2013.01); *G06K 9/00664* (2013.01); *G06K 9/00986* (2013.01); *G06N 3/02* (2013.01)

(58) Field of Classification Search
CPC .. G06K 9/72; G06K 9/00664; G06K 9/00986; G06K 9/62; G06N 3/0454; G06N 3/02
See application file for complete search history.

(56) References Cited

U.S. PATENT DOCUMENTS

2013/0273968 A1* 10/2013 Rhoads ................... H04W 4/50
455/556.1
2019/0065856 A1*  2/2019 Harris .................. G06K 9/6257

* cited by examiner

*Primary Examiner* — Diane D Mizrahi
(74) *Attorney, Agent, or Firm* — Mark M. Friedman

(57) ABSTRACT

A method of analysing an image the image transmitted from a local image acquisition device to a local image processor; the local image processor processing the image locally in order to define at least one context descriptor relevant to a scene contained in the image.

17 Claims, 15 Drawing Sheets

CONTEXTUALLY AWARE SYSTEM AND METHOD

The present invention is in the technical field of computer vision. More particularly, but not exclusively, the present invention is in the technical field of object and scene recognition, more particularly, but not exclusively, where such functionality is carried out on a portable digital device, whereby scenes are characterized by context descriptors.

BACKGROUND OF THE INVENTION

Object and scene recognition can be used to identify items through a camera and computer system. Currently, object and scene recognition can be used to generate a text description of a photograph or video frame. Some other cases see web pages opening describing the item present in the photo, or associating it with commercial products present in the image allowing the user to purchase or inspect them. However, image recognition is not currently being used directly on mobile hardware to capture surrounding information in real-time for analytics and user experience enhancements. Mobile device microphones are used as "always on" to continuously listen to certain commands to assist users. These commands are then sent to a remote server where they are analysed and interpreted. Likewise, the GPS antenna of mobile devices is used to track users within a map by feeding their position to $3^{rd}$ parties. While both these methods present ways of capturing user information, they do not reveal rich context, and require scrutiny of a user's position or voice commands by a remote party.

Embodiments of the present invention seek to address or ameliorate the above mentioned problems.

It would be desirable on the other hand to provide a system which processes captured information locally which may allow the user to maintain privacy, whereby the phone or other portable device itself may use its internal components to process images and understand them, and react accordingly based on the user context. Likewise, rather than revealing the position on a map of where the user is operating the mobile device, it may provide more discrete, yet rich keywords such as "in restaurant", or "inside train". In preferred forms, it would be advantageous if there was provided a system and apparatus which may interpret mobile device user context through local image recognition.

SUMMARY OF THE INVENTION

Definitions context descriptor: in this specification "context descriptor" refers to an element of data which comprises a short language description (typically one or two words if in English for example) of a scene or a portion thereof. Broadly the description will be chosen to assist a user to understand the context of the environment pertaining to a portable digital device being used by the user. So, by way of nonlimiting example, if the portable digital device is located within a restaurant then the context descriptor may be the word "restaurant". Longer, more comprehensive descriptions are also envisaged such as, for example, "in restaurant—at table—no food on table" or "in aeroplane cabin, seated, no forward movement".

portable digital device: in this specification a portable digital device is a device which can easily be transported by one person—for example by being light enough and small enough to be handheld- and which contains at least a processor and memory and related input output which permits it to execute programs and communicate the output of those programs both locally to a user—for example by way of a display—and also to communicate the output to remote locations for example by use of radio transmission capability. In particular forms the portable digital device may take the form of a smart phone-which is to say a mobile telephone device (sometimes termed a cell phone) which has the ability not only to make telephone calls but also the ability to execute programs in the form of "apps" whereby the smart phone can carry out many other functions beyond that of a telephone.

In preferred forms the present invention relates to a system to recognize objects and scenes in images captured by a mobile device camera automatically or upon manual triggers with the purpose of obtaining a description of the surrounding physical context and the user intent. In preferred forms the system uses object and scene recognition to understand the elements camera images by processing them locally on the device, then produces a description that can be used by the running software or as a form of analytics. The ultimate goal of the system is to provide contextual awareness to mobile devices without involving external parties in analyzing imagery, and/or in order to assist the user in capturing analytics about their use of software.

In preferred forms, the present invention provides a system for interpreting surrounding visual information through a mobile device camera without transferring imagery to external parties and producing information about the user context to assist them with their use of the device software, ultimately acting as an automated intelligent agent for understanding physical context through vision.

In preferred forms, the present invention provides a computer system functioning on mobile phones, tablets, and other portable computer systems rendering them capable of interpreting the identity of areas and momentary situations through sight, in order to collect analytics about user behaviors and assist users by adjusting software to real-world contexts without any user prompt. In preferred forms, the system is formed by an object recognition system configured to interpret imagery captured by the camera as locations and situations. In preferred forms the system exists within or alongside other mobile device software and operates in the background of other tasks, such as browsing a website or searching through an application. In preferred forms, at intervals, or after a user action, the camera captures imagery and transfers it to the image recognition system, present inside the smartphone or other portable digital device. Once the image is recognized, the system may produce a context descriptor, to produce relevant information about the imagery without exporting the image or exposing the image itself to third parties. When the context descriptor is produced, it may be used by other software within the device to adjust functionalities based on contextual awareness of the user situation, or sent to a remote server to collect as analytics about the user, without disclosing any pixel information. Custom behaviors are actions and operations programmed to trigger when certain imagery is recognized. They can either be triggered internally as a closed loop where the image description is fed directly to software on the device, or through a third party after the description has been sent to a 3rd party such as the company owning and managing the software, which wants to adjust user experience based on the user's present situation, such as a software for searching for restaurants adjusting the software interface after receiving a context description from the invention installed in a mobile device. The arrangement of physical items or visual aspects of the objects and scenes recognized are interpreted as different situations, such as being within a restaurant with, or without food on the table, or being inside a car in the front seat or back seat.

Accordingly, in one broad form of the invention there is provided a method of analysing an image the image transmitted from a local image acquisition device to a local image processor; the local image processor processing the image locally in order to define at least one context descriptor relevant to a scene contained in the image.

Preferably the local image processor utilises a first processing algorithm to define a class or object within said scene.

Preferably said local image processor utilises at least one associated local input.

Preferably the local image processor utilises the at least one associated local input to trigger generation of said at least one context descriptor.

Preferably the associated local input comprises a GPS signal.

Preferably the associated local input comprises a clock signal

Preferably the associated local input comprises a accelerometer signal

Preferably the associated local input comprises a gyroscope signal.

Preferably the associated local input is a local switch.

Preferably the associated local input is a touchscreen switch.

Preferably the local image processor utilises a second processing algorithm to define the at least one context descriptor.

Preferably the local image processor utilises output from the first processing algorithm to define the at least one context descriptor.

Preferably the local image processor utilises at least one associated local input to define the at least one context descriptor.

Preferably the local image processor utilises output from the first processing algorithm and at least one associated local input to define the at least one context descriptor.

Preferably the first processing algorithm utilises a convolutional neural network algorithm to process the image.

Preferably the second processing algorithm utilises a convolutional neural network algorithm to process the image thereby to define said at least one context descriptor relevant to said scene contained in the image.

Preferably the local image acquisition device and local image processor form part of and are mechanically and electronically associated with a portable digital device.

Preferably the portable digital device is a smart phone.

Preferably the portable digital device is a wearable device.

Preferably the portable digital device is an augmented reality headset.

Preferably the scene is static relative to the portable digital device.

18 the method of any one of claims 1 to 16 wherein the scene is moving relative to the portable digital device.

Preferably the descriptor of any objects, the parameters of movement of any objects and parameters of movement of the portable digital device are made available on the portable digital device to said local processor.

Preferably the context descriptor is fed to a transmitter for transmission to a remote processor.

Preferably the context descriptor is utilised within the image processor or on board local analytics engine in order to deduce analytics and user experience enhancements for communication to a user of the portable digital device.

Preferably the context descriptor is communicated to a remote analytics engine in order to deduce analytics and user experience enhancements for communication to a user of the portable digital device.

Preferably the context descriptor is communicated to a remote analytics engine and without also communicating said image whereby the remote analytics engine is utilised to deduce analytics and user experience enhancements for communication back to a user of the portable digital device.

Preferably deduction is performed in real time and communicated to the user in real time.

In a further broad form of the invention there is provided a portable digital device including at least a local image acquisition device and a local image processor; said local image processor executing the method described above in order to define at least one context descriptor relevant to a scene contained in an image acquired by the local image acquisition device.

In a further broad form of the invention there is provided a portable digital device including at least a local image acquisition device and a local image processor; and at least one associated input; said local image processor executing the method defined above in order to define at least one context descriptor relevant to a scene contained in an image acquired by the local image acquisition device.

Preferably the first processing algorithm is executed on a first on-board processor.

Preferably the second processing algorithm is executed on the first on-board processor.

28 the device of claim 25 wherein the second processing algorithm is executed on a second on-board processor.

29 The device of any one of claims 26 to 28 wherein the first on-board processor is a GPU (graphics processing unit)

Preferably the first on-board processor is a CPU (central processing unit)

Preferably the first on-board processor and a second on-board processor are combined on one processing chip.

Preferably the processing chip is a system on chip (SOC) processor.

BRIEF DESCRIPTION OF THE DRAWINGS

Embodiments of the present invention will now be described with reference to the accompanying drawings wherein.

DETAILED DESCRIPTION OF THE PREFERRED EMBODIMENTS

Embodiments of the present invention will now be described. Like components are numbered similarly from drawing to drawing where they have the same function.

Figure 1:
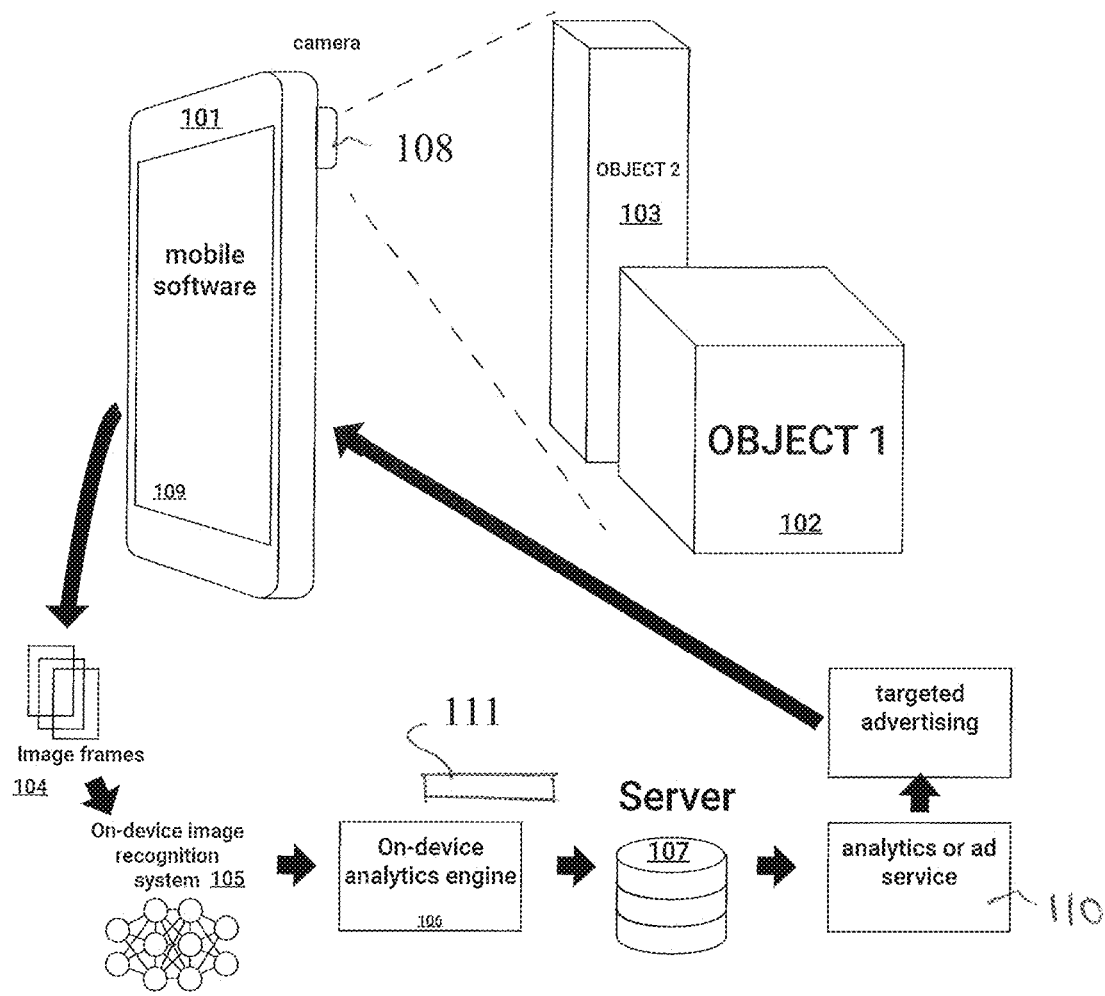
FIG. 1 is a block diagram of operation of the system according to a first preferred embodiment.

With reference to FIG. 1, a mobile phone 101 having a camera 108 takes an image (picture) of first and second objects 102, 103. The mobile phone 101 is capable of running mobile software applications 109. One or more such image frames 104 are processed by an on device image recognition system 105 which then communicates with an on device analytics engine 105. The engine is able to translate recognised objects & scenes into analytics in the form of context descriptors 111, such as "restaurant location" or "outdoors, city" for targeted advertisements. In one form this output is sent to a server 107 to match it with analytics or ad services 110 so that they can provide ads or recommendations targeted based on the visible situation that the user associated with the mobile device 101 is in. The image recognition happens locally so there are no privacy concerns and the analytics or ad services can know richer information about the user without having to collect too much background details and cookies, and have a more timely and situational understanding on how to help the user.

Figure 2:
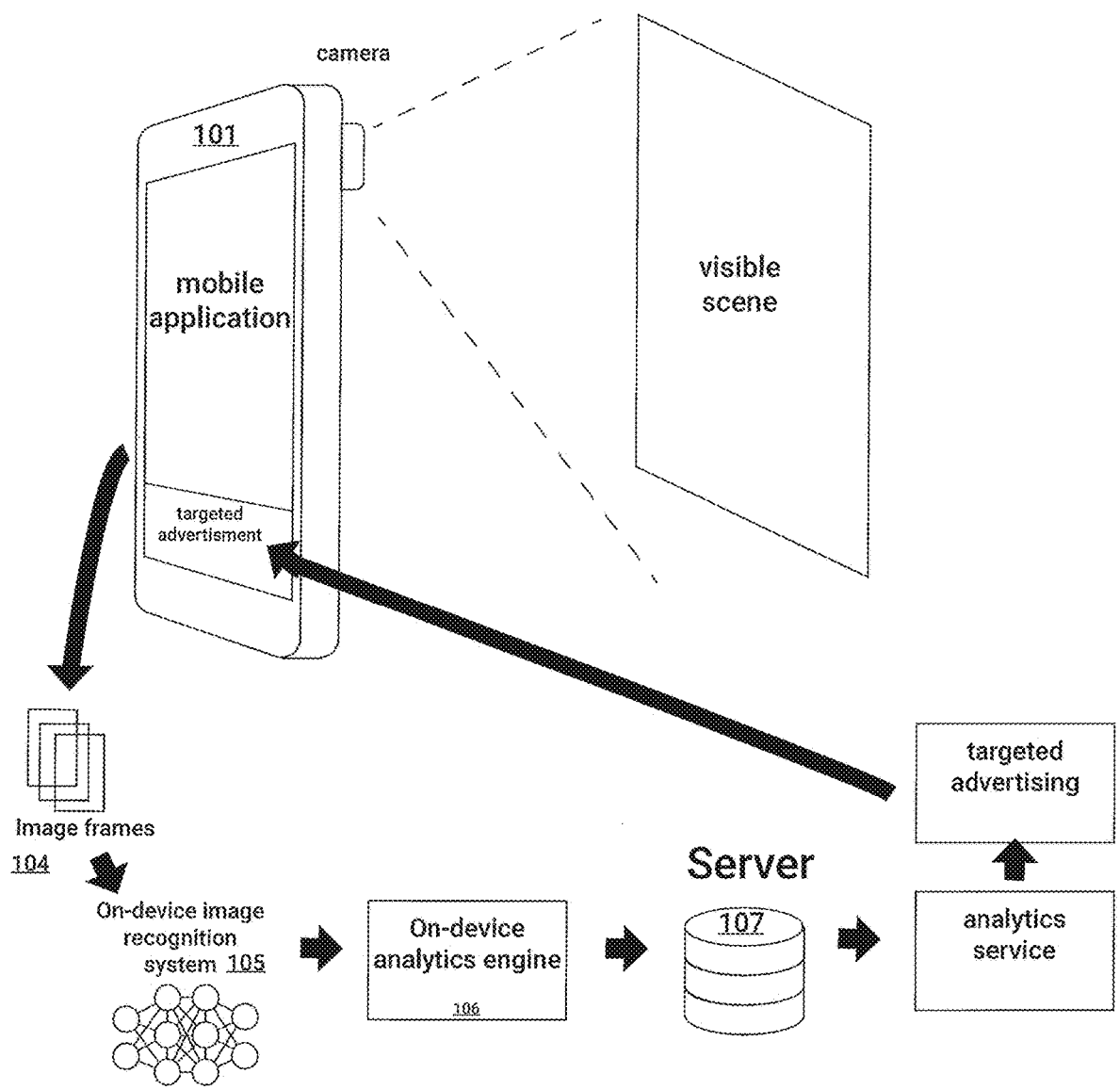
FIG. 2 illustrates a further step in the operation of the system of FIG. 1.

With reference to FIG. 2, image recognition is not limited by objects, but can embody entire scenes, colors, or patterns. In addition, the scene being captured can have dynamic elements in movement, hence the need to capture multiple frames in certain situations to gain a better understanding of whether a user is in a dynamic state like walking, or a sedentary one like browsing at home.

Figure 3:
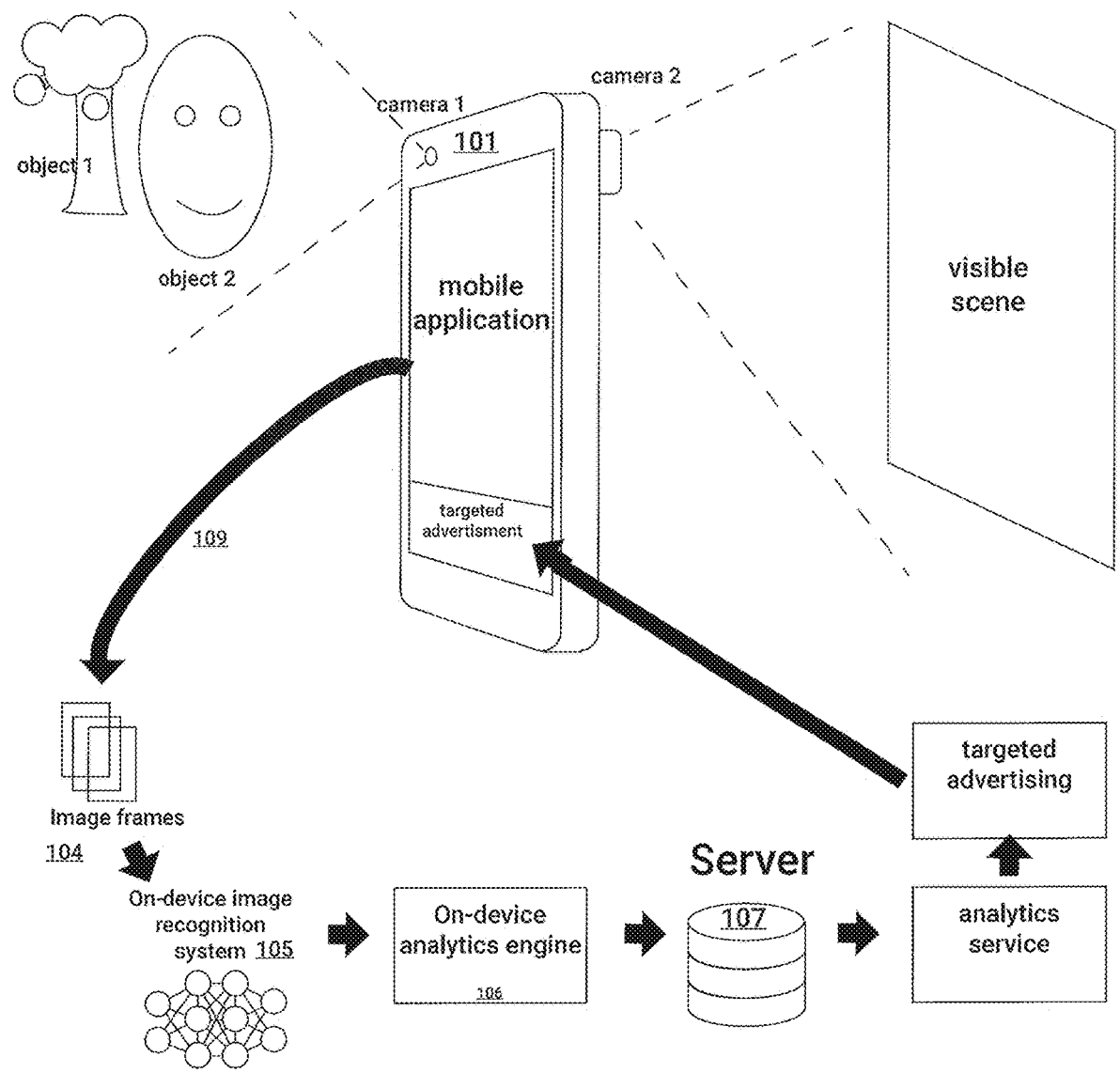
FIG. 3 illustrates a further step in the operation of the system of FIG. 1.

With reference to FIG. 3, all cameras present on a device can be used to collect this information, either together or independently. The front-facing camera in most devices can capture frames that help understand whether the phone is being used actively or is not being engaged with so that information is not sent to a non-existing audience. Because the image recognition is locally run on the device, the user's privacy is kept in mind as well as power and data being saved by running things locally.

Figure 4:
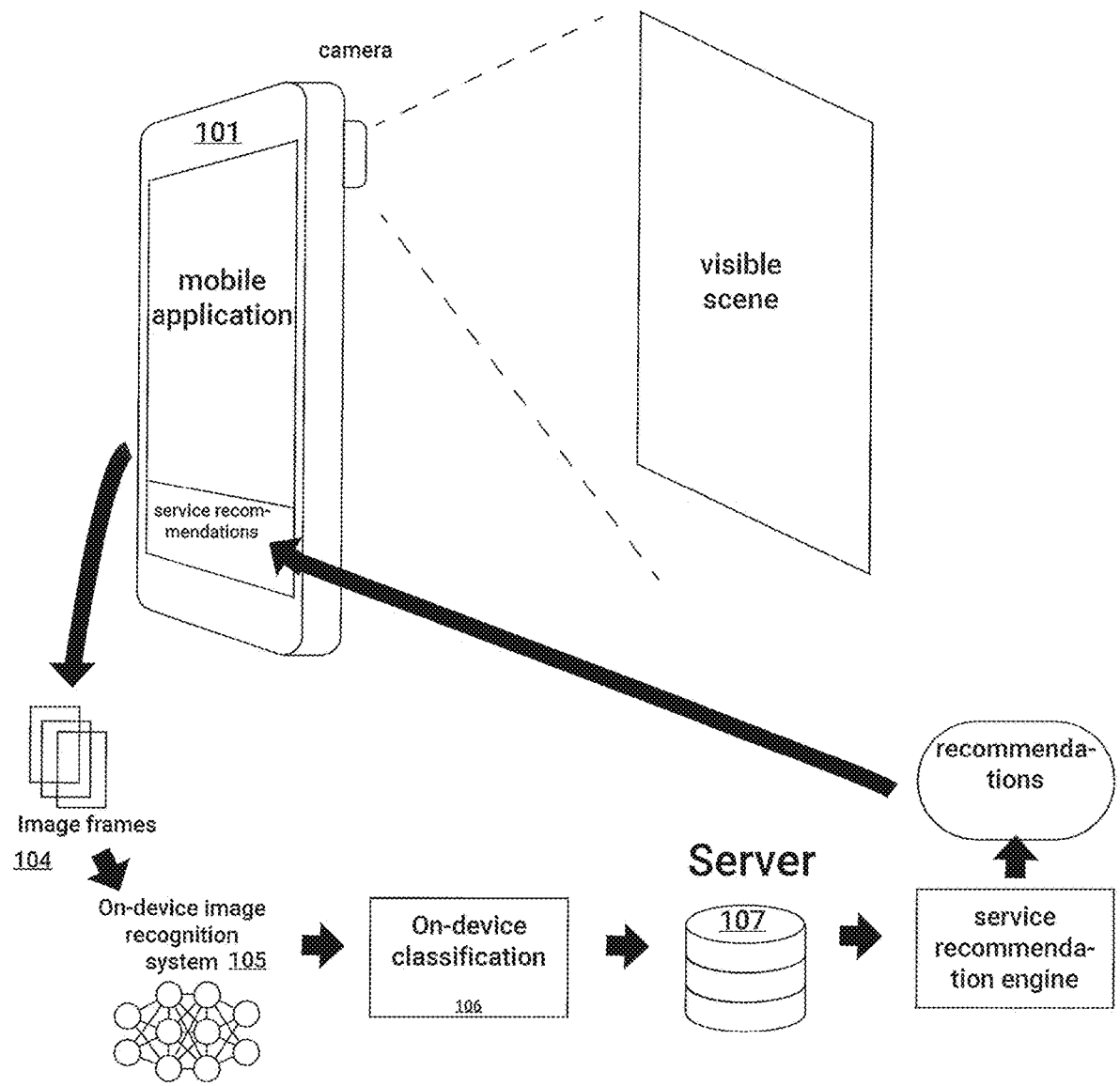
FIG. 4 illustrates a further step in the operation of the system of FIG. 1.

With reference to FIG. 4, the system is not limited to advertising, but also recommendations.

The on-device classification in one preferred form may take the form of a spreadsheet matching recognised "classes" or the output of a neural-network image recognition system to possible situations the user is in, such as "in a restaurant" or "at the beach" thereby to form context descriptors 111 This output may be sent to a server and shared with 3$^{rd}$ party ad platforms, or simply with the app's provider itself which can provide the user with better contextual information now that they know their physical situation in rough terms with reference to the context descriptor 111 or one or more such context descriptors.

Figure 5:
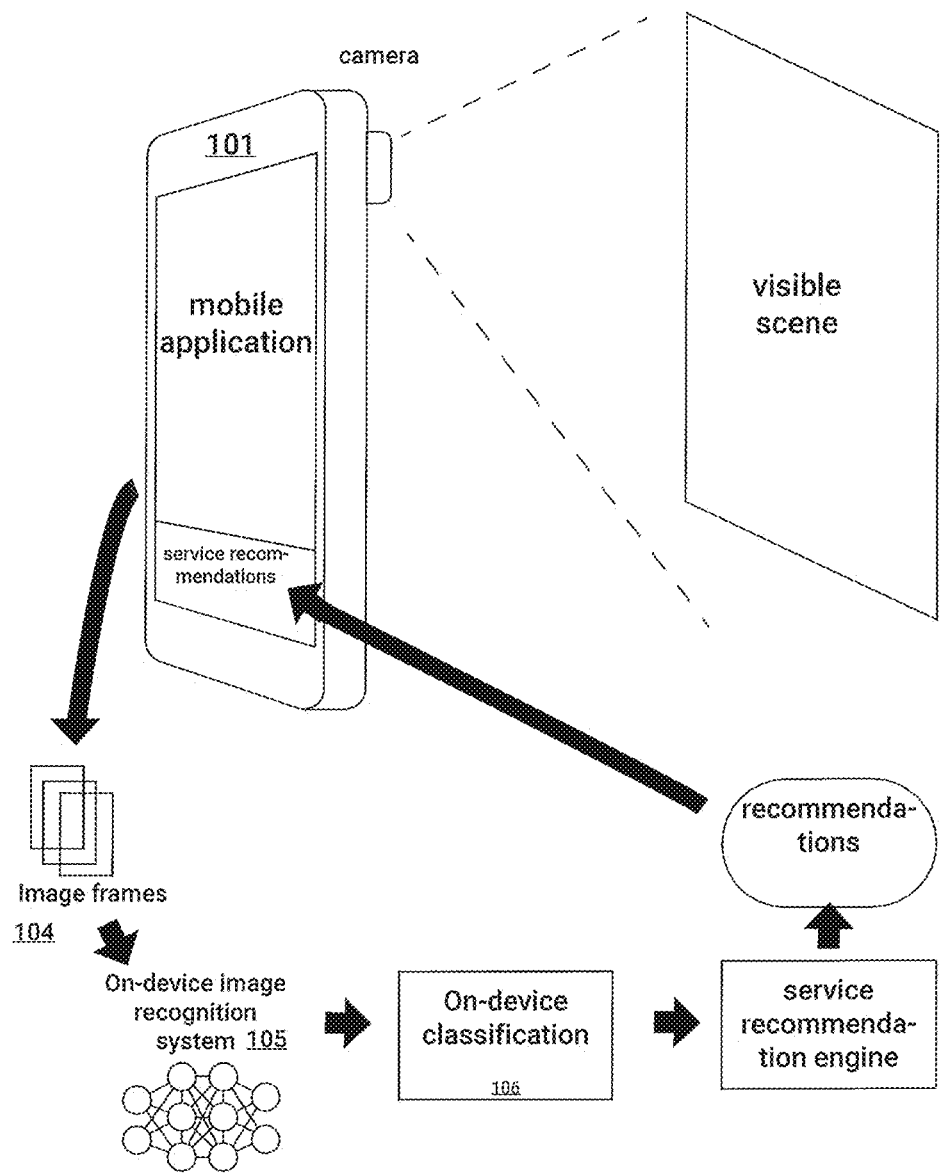
FIG. 5 illustrates a further step in the operation of the system of FIG. 1.

With reference to FIG. 5, in an alternative form recommendations can be provided directly on the device without sending information outside of its environment (for example to an external server). For example, services like "Siri Suggestions" on iOS9 recommend apps on the Spotlight Screen on iPhones based on time of day, recently used apps, and more analytics. In preferred forms the present application utilises image recognition to that array of suggestion analytics by taking a picture in the background of an app or mobile software, and identifying the situation the phone is in as one or more context descriptors 111.

Figure 6:
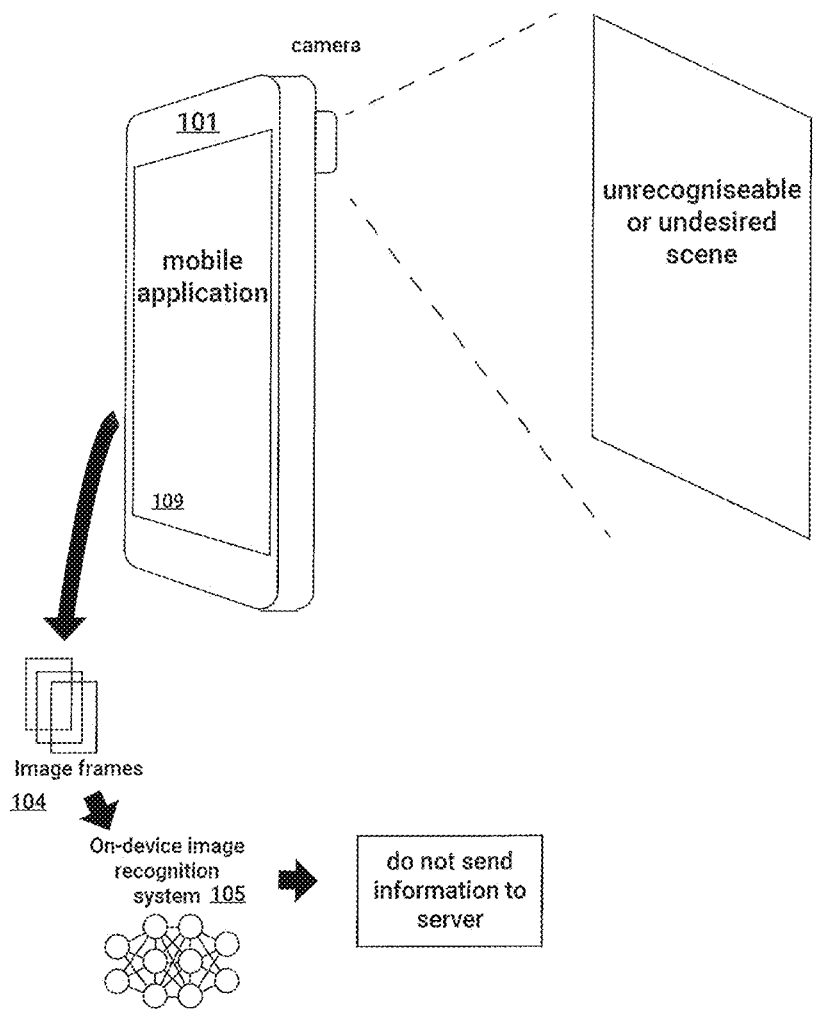
FIG. 6 illustrates a further step in the operation of the system of FIG. 1.

With reference to FIG. 6, when a scene cannot be understood by the on-board image recognition system, or it is an undesirable scene that would not produce any useful analytics, the image recognition system can return a class specifying not to send any information about the analysed image to the server, either to protect the user's privacy, or to prevent any data to be used for meaningless purposes.

Figure 7:
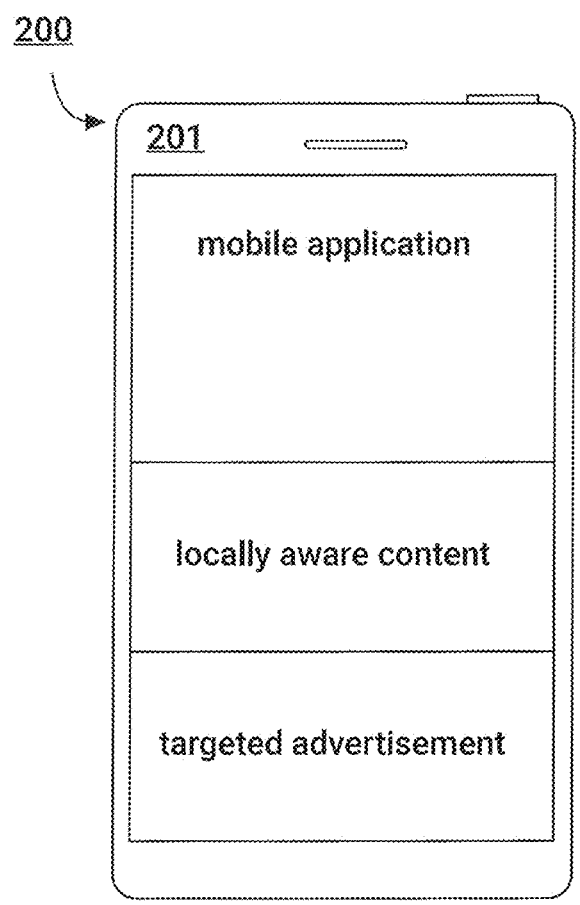
FIG. 7 illustrates information available to a user on a user interface pursuant to a further step in the operation of the system of FIG. 1.

With reference to FIG. 7, once an image is recognised and relevant information is drawn from it, the currently running app 109 can provide recommendations to the user based on the interpreted image, such as a restaurant app while the user is in a restaurant or outdoors. Likewise, targeted advertisements can also be displayed based on the information inferred by the image.

Figure 8:
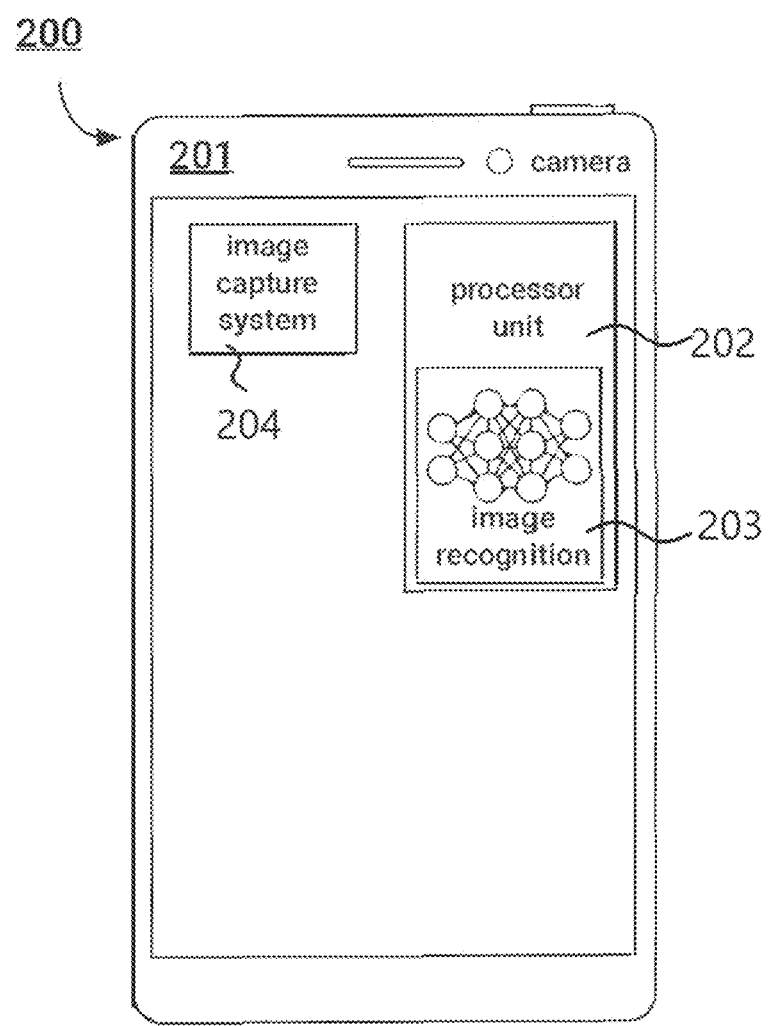
FIG. 8 is a block diagram of the main processing components on a digital device operable in accordance with the system of FIG. 1.

With reference to FIG. 8, in another form of the contextually aware system 200, an image capture system 204 installed on smartphone 201 connected to the phone's cameras sends a series of images to the device's processor 202, which processes the image in a neural network 203 tailored for use on mobile phones, that outputs a number of "classes" or identified concepts to a classification engine on the running software that discerns whether the captured image is of any value. If it is, relevant information will be displayed to the user on screen.

Figure 9:
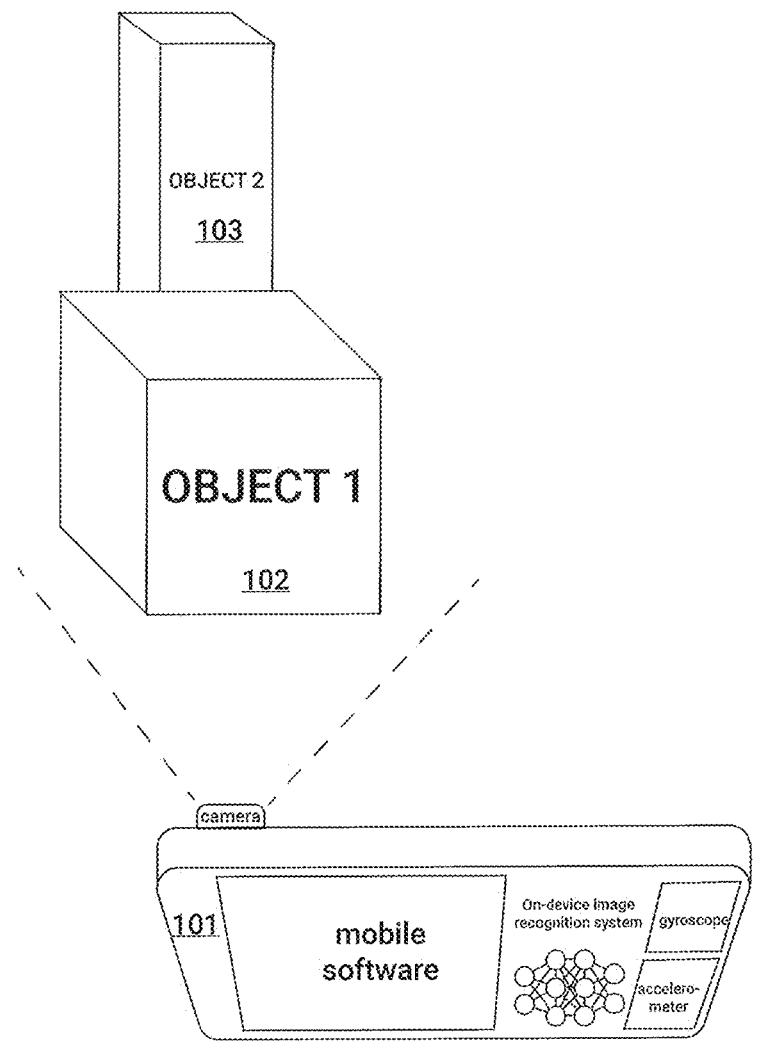
FIG. 9 provides a scenario of use of the digital device of FIG. 8.

With reference to FIG. 9, the orientation of the mobile device can also be inferred using the image recognition system if the recognized elements are found to be in rotated or tilted positions. Since many times mobile devices are held pointing to the ground, this system can also make use of a gyroscope (or equivalent software enablement given effect by use of an accelerometer) to gain a better understanding of what it is looking at. For example, if the gyroscope detects that the phone is tilted downwards, it can communicate with the image recognition system so that it can discriminate towards elements usually found on ceilings. Likewise, if the accelerometer detects harsh movement, it can communicate with the image recognition system and camera to prompt it not to capture an image to avoid it being blurry.

Figure 10:
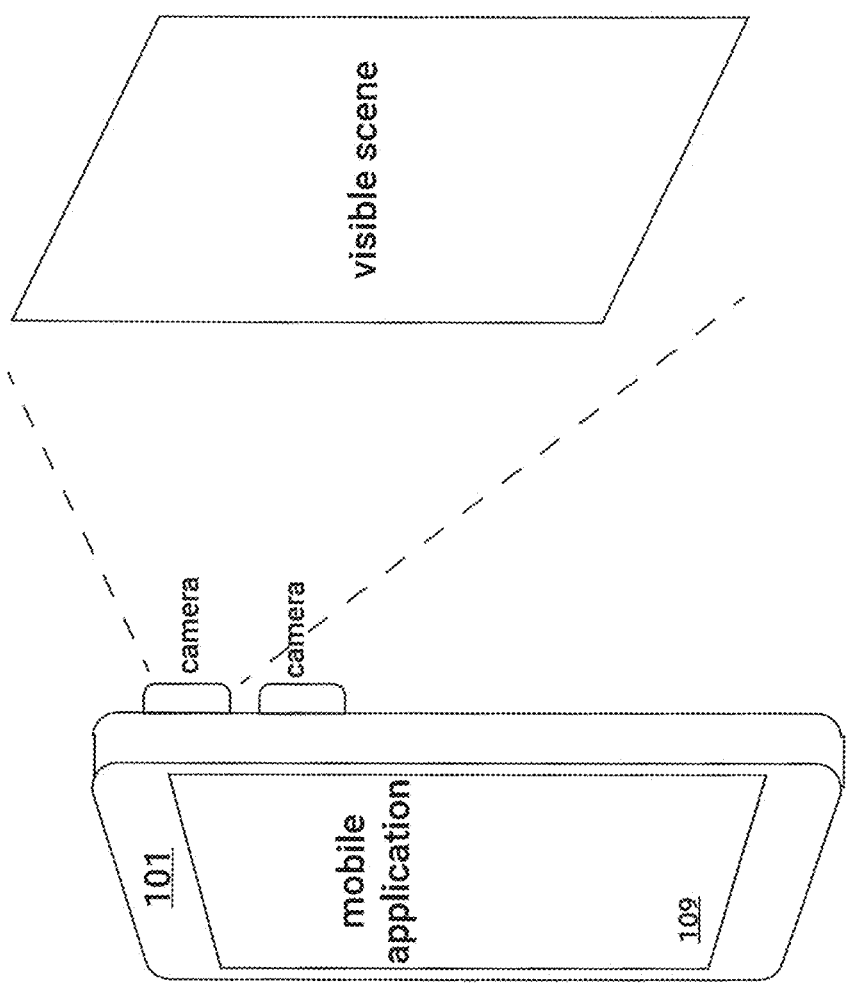
FIG. 10 provides a further scenario of use of the digital device of FIG. 8.

With reference to FIG. 10, some mobile devices can have more than one image capture system or camera with different lenses or aperture configurations. Any camera able to capture images can be used in this system.

Figure 11:
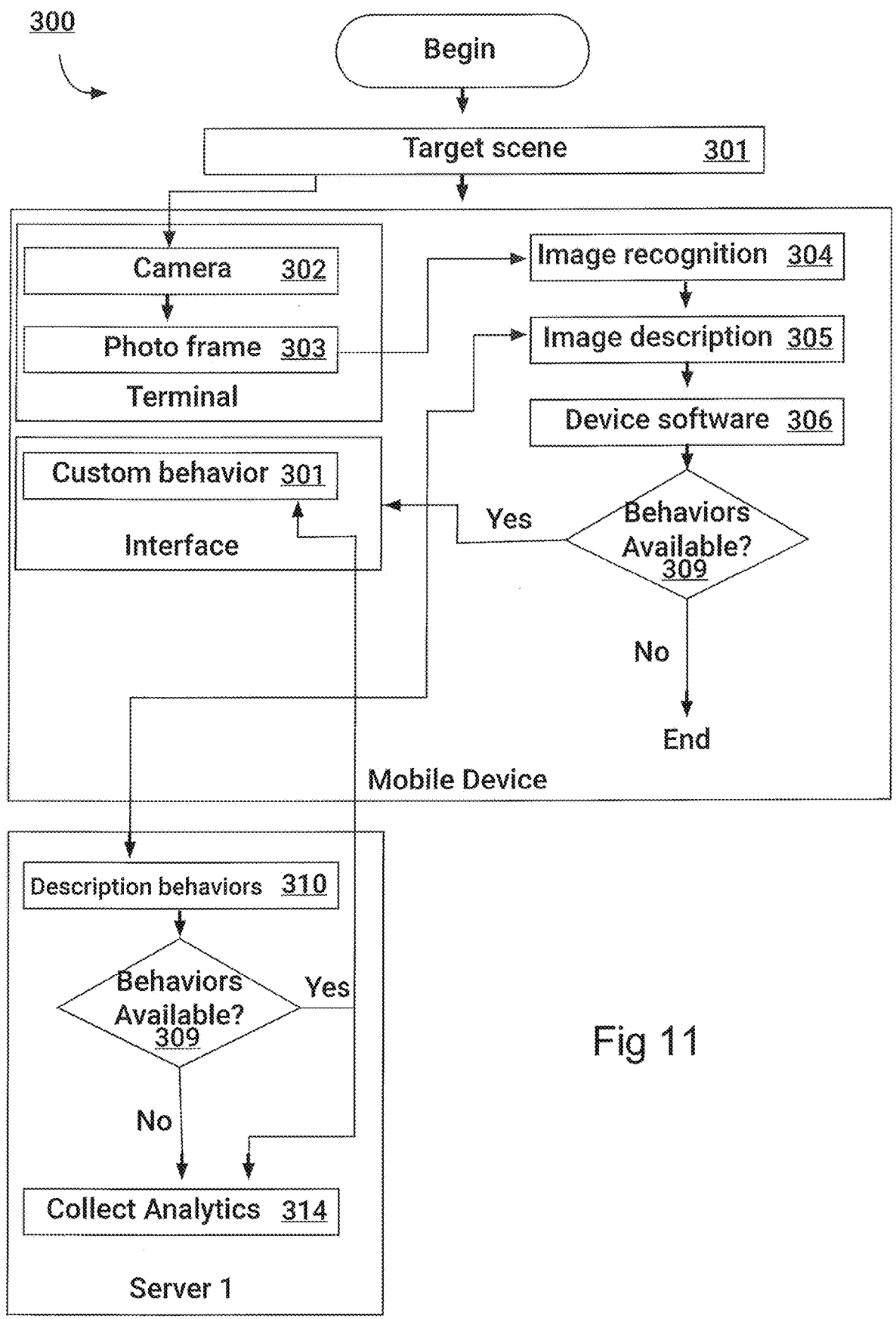
FIG. 11 is a flowchart of the steps available to give effect to the system of FIG. 1.

FIG. 11 is a flowchart of the steps available to give effect to the system of FIG. 1. Steps 301 through to 314 operate as described in the labelled function boxes of FIG. 11.

In Use—Example 1

Figure 12:
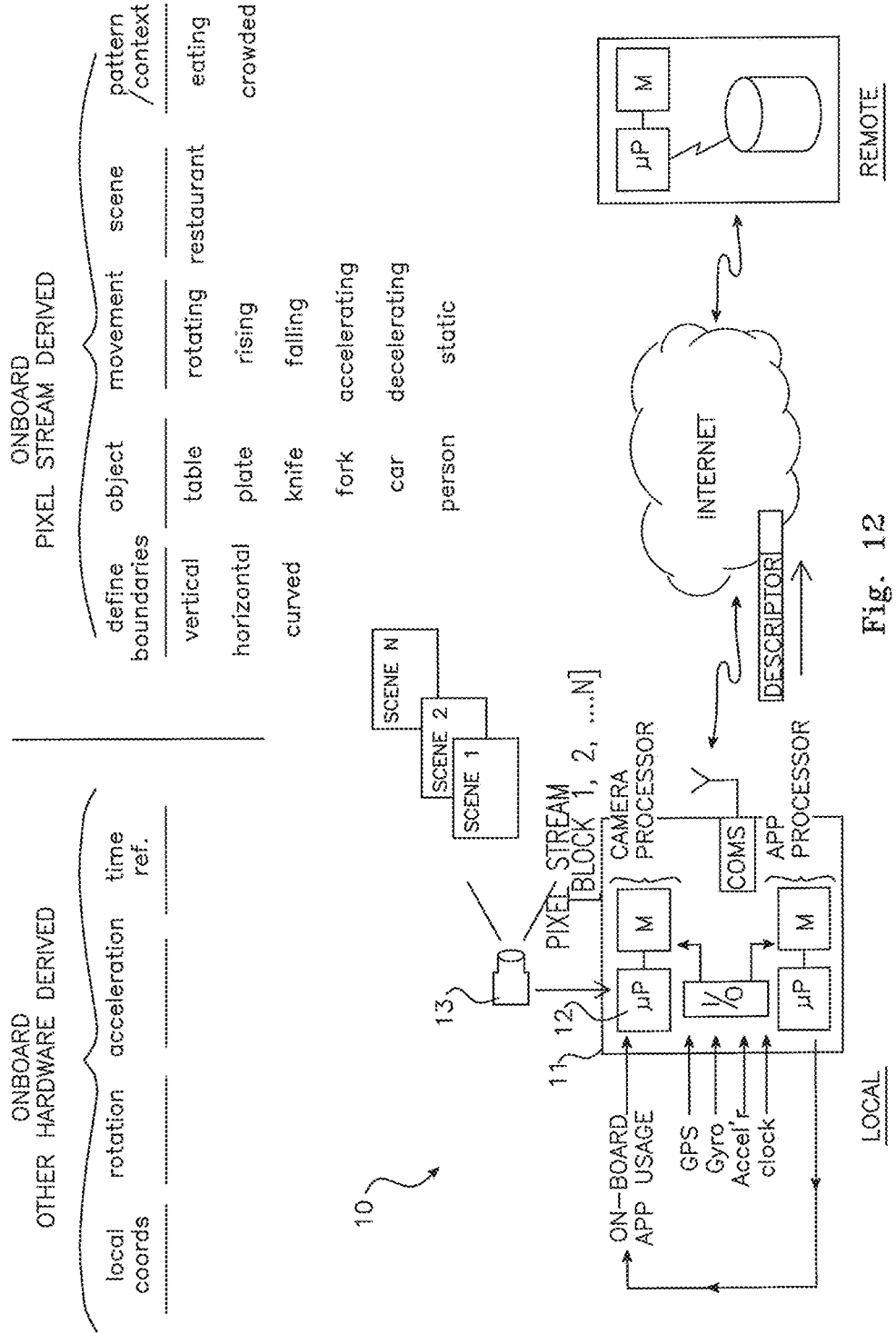
FIG. 12 is a block diagram of a contextually aware system in accordance with an embodiment of the present invention.

With reference to FIG. 12 there is illustrated a contextually aware system 10 in this instance comprising a portable digital device 11 containing at least a camera processor 12 in electronic communication with a camera 13. In this instance the camera 13 is mechanically associated with the portable digital device 11. In particularly preferred forms the camera 13 is mounted within a single enclosure (not shown), which enclosure also encloses the camera processor 12 and other electronic and mechanical components relevant to the function of the portable digital device.

In particular forms the portable digital device 11 takes the form of a smart phone-which is to say a mobile telephone device (sometimes termed a cell phone) which has the ability not only to make telephone calls but also the ability to execute programs in the form of "apps" whereby the smart phone can carry out many other functions beyond that of a telephone.

Figure 13:
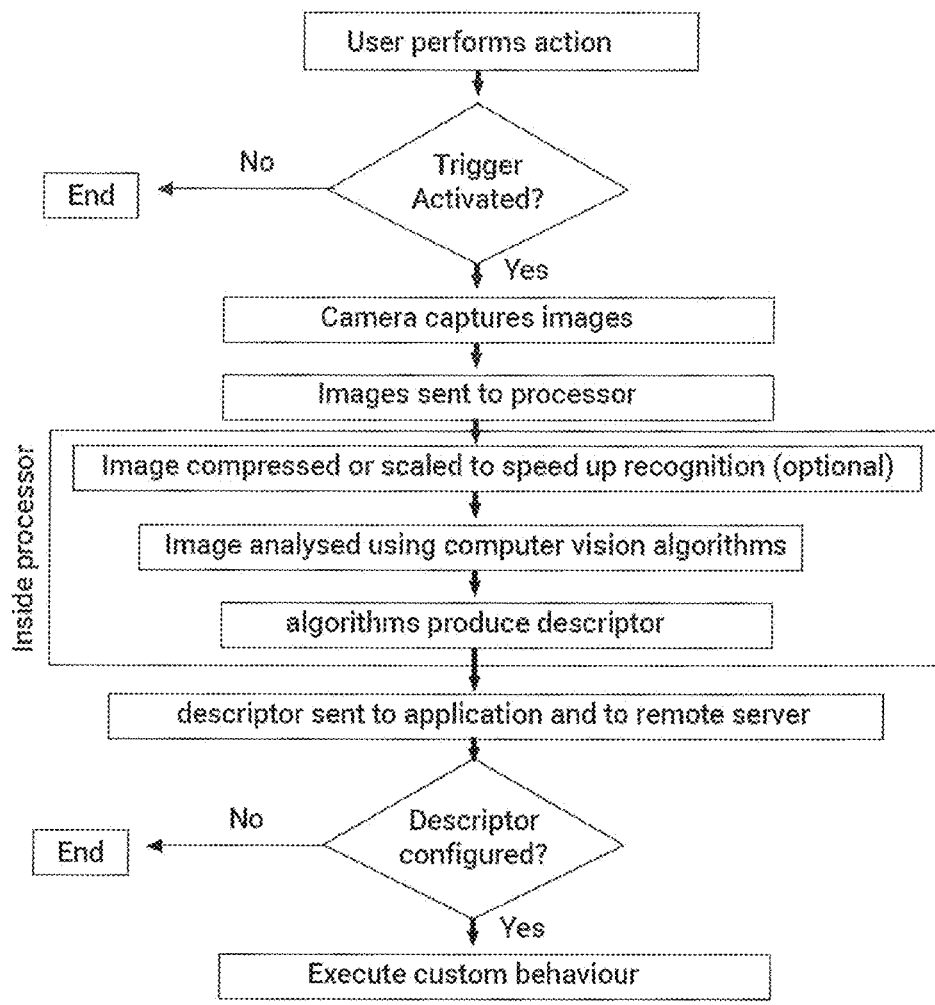
FIG. 13 is a flow chart of steps executed by the processor on the portable digital device of the system of FIG. 12.

FIG. 13 is a flow chart of steps executed by the processor on the portable digital device of the system of FIG. 12.

With reference to FIG. 13 for the purposes of the system of the present invention the image is never sent outside the phone. All processing to produce the context descriptors is performed within the portable digital device in this instance most often in the form of a smart phone. The trigger of capturing the image, may be a user action (user presses button A) or related to any sensor on the phone (clock, accelerometer, etc). The image recognition system, which runs on the phone, and can be a neural network or similar algorithm, ultimately produces a context descriptor as defined in this specification This context descriptor is used to interpret what situation the user is in, and an external party can choose whether to assist the user or not without seeing any visual information beyond the context descriptor. In other words, the phone "thinks on its own" and communicates when the user is in a certain situation. The external party can configure descriptors, which are composed of words and/or numbers, to trigger custom behaviours, such as displaying meal suggestions if a user is inside a restaurant—turning the camera into a new "phone sensor" that doesn't have to send full data to the cloud, just the context descriptor 111. What happens to the image itself after the image recognition algorithm scans it is irrelevant. It may be scrapped, or stored if it can be useful for the user in the future. For example you can ask your phone "what resturant did I go to last Tuesday" and it would be able to find that image. It could also just store the descriptor and metadata, like clock, or coordinates. In at least some forms once a context descriptor has been generated from an image it is deleted from memory thereby to save memory space and, in at least some forms, conform to privacy constraints.

Figure 14:
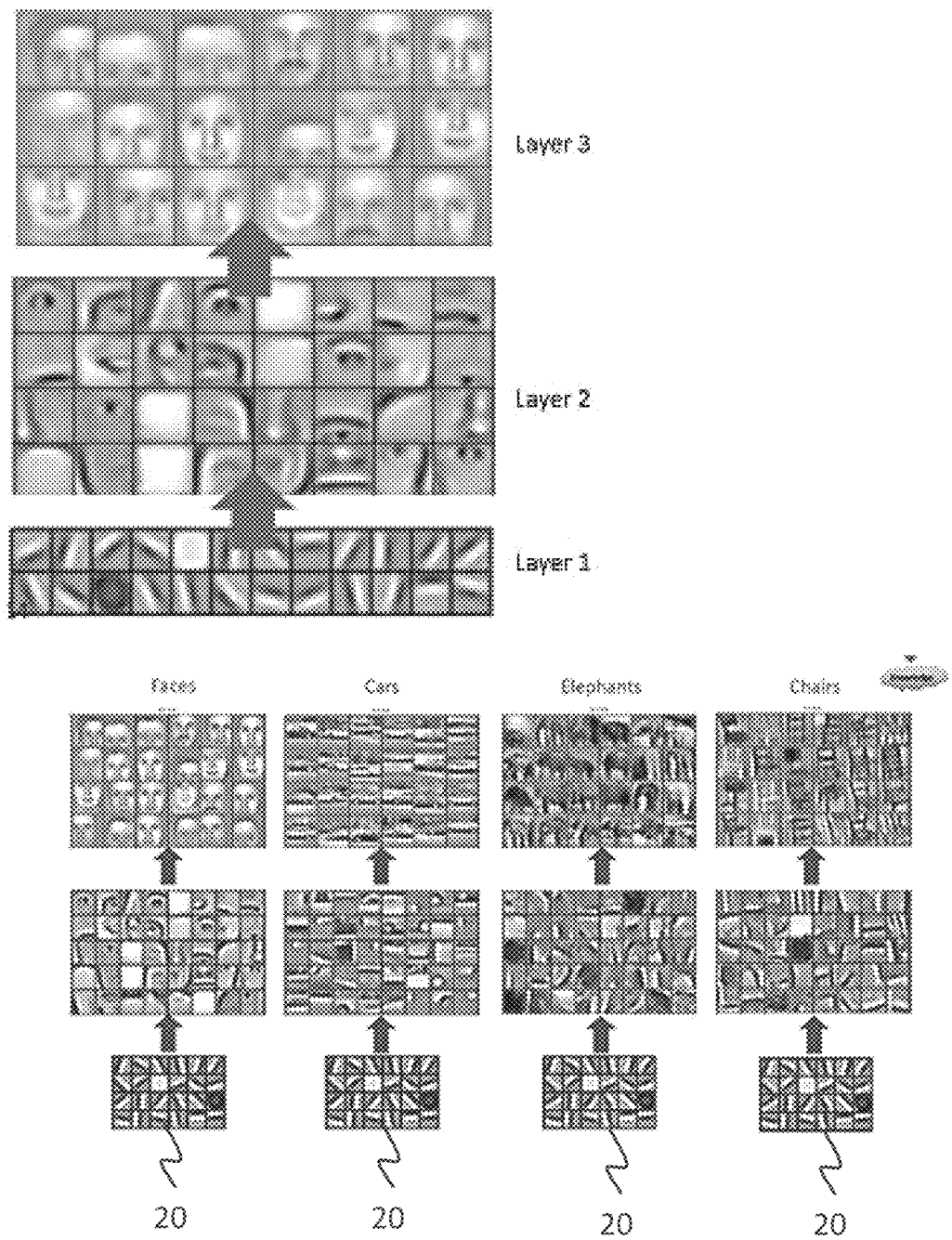
FIG. 14 is a diagrammatic flow chart of use of a convolutional mural network algorithm to effect contextual recognition for the system of FIG. 12.

FIG. 14 is a diagrammatic flow chart of use of a convolutional mural network algorithm to effect contextual recognition for the system of FIG. 12.

The pixels forming an image are arranged in an array with each pixel having a value corresponding to light value or intensity. At an initial level, a convolution is applied to an image array of pixels to compare the pixels with reference shapes. The most statistically likely shapes are then taken and used to apply the process again to more complex reference shapes. The process can be repeated multiple times. In the example of the process shown in FIG. 14 the tiny squares 20 may be pixels or groupings of pixels from an image sensor and are known as "artificial neurons" and they are structured in "layers", with the simplest ones being in the $1^{st}$ layer, and the more complex ones (full faces, cars, items) being further down the network. These neurons are dragged over an image, and when they are laid upon a section that is statistically similar to them, they "fire", letting the other neurons connected to them know that there is something noteworthy there. A neuron trained to recognize curves tells a neuron trained to recognize wheels, which then tells one that can recognize cars that there is something interesting in the section of a picture.

Figure 15:
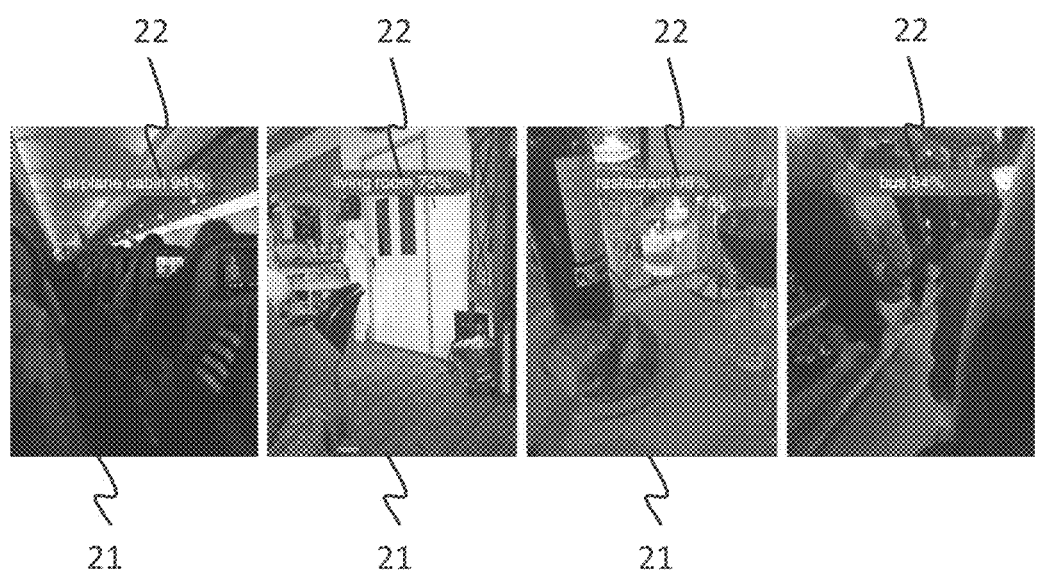
FIG. 15 illustrates examples of contextual output for selected scenes effected by the system of FIG. 12.

FIG. 15 illustrates examples of contextual output for selected scenes effected by the system of FIG. 12.

The end result of utilisation of the layered process shown in FIG. 14 is an image 21 with a context descriptor 22 associated with it. In some forms the context descriptor also includes a probability value defining the likelihood that the descriptor has correctly categorised the image 21. All that is sent outside of the phone is the descriptor 22 inside the oval, while the image 21 may be discarded. Utilising the system one may ascertain what proportion of users of Service X use it while on a bus, without having to track them down individually by collecting their coordinates.

In Use—Example 2

In a particular use scenario a scene maybe flagged for a particular form of processing.

In use a user may intentionally direct the image acquisition device at a particular scene and trigger processing by way of an associated local input. This may be for example in the form of a switch and more particularly in the form of a touchscreen switch. In this instance the scene will be processed so as to define at least one context descriptor relevant to the scene.

In this instance the scene will be transmitted to a remote processor in order to deduce analytics relevant to that scene which will be transmitted back to the user. In a preferred form the context descriptor relevant to that scene will also be transmitted to the remote processor.

Examples of the particular scene and the resulting analytics relevant to that scene may include: particular scene is a movie advertisement; resulting analytics provide offer to purchase movie tickets.

Particular scene is an item of food; resulting analytics provide dietary information pertinent to that food.

Particular scene is a husky dog; resulting analytics provide specific breed information to the user.

The invention claimed is:

1. A method of analyzing an image comprising:
   transmitting the image from a local image acquisition device to a local image processor; and
   defining at least one context descriptor relevant to a scene contained in the image, by processing the image locally by the local image processor,
   wherein the local image processor utilizes a first processing algorithm to define a class or object within said scene;
   wherein the local image processor utilizes a second processing algorithm to define the at least one context descriptor; and
   wherein the second processing algorithm utilizes a neural network algorithm to process the image thereby to define said at least one context descriptor relevant to said scene contained in the image.

2. The method of claim 1 wherein said local image processor utilizes at least one associated local input.

3. The method of claim 2 wherein the local image processor utilizes the at least one associated local input to trigger generation of said at least one context descriptor.

4. The method of claim 2 wherein the associated local input comprises a Global Positioning System (GPS) signal.

5. The method of claim 2 wherein the associated local input comprises a clock signal.

6. The method of claim 2 wherein the associated local input comprises a accelerometer signal.

7. The method of claim 2 wherein the associated local input comprises a gyroscope signal.

8. The method of claim 2 wherein the associated local input is a local switch.

9. The method of claim 2 wherein the associated local input is a touchscreen switch.

10. The method of claim 1 wherein the local image processor utilizes output from the first processing algorithm to define the at least one context descriptor.

11. The method of claim 1 wherein the local image processor utilizes at least one associated local input to define the at least one context descriptor.

12. The method of claim 1 wherein the local image processor utilizes output from the first processing algorithm and at least one associated local input to define the at least one context descriptor.

13. The method of claim 1 wherein the first processing algorithm utilizes a convolutional neural network algorithm to process the image.

14. The method of claim 1 wherein the local image acquisition device and local image processor form part of and are mechanically and electronically associated with a portable digital device.

15. The method of claim 14 wherein the portable digital device is a smart phone.

16. The method of claim 14 wherein the portable digital device is a wearable device.

17. The method of claim 14 wherein the portable digital device is an augmented reality headset.

\* \* \* \* \*